US009628208B2

(12) United States Patent
Massimi

(10) Patent No.: US 9,628,208 B2
(45) Date of Patent: Apr. 18, 2017

(54) SYSTEM, METHOD AND PROGRAM PRODUCT FOR CUSTOMIZING PRESENTATION OF TELEVISION CONTENT TO A SPECIFIC VIEWER AND LOCATION

(75) Inventor: Michael L. Massimi, South Hamilton, MA (US)

(73) Assignee: International Business Machines Corporation, Armonk, NY (US)

(*) Notice: Subject to any disclaimer, the term of this patent is extended or adjusted under 35 U.S.C. 154(b) by 2700 days.

(21) Appl. No.: 12/037,770

(22) Filed: Feb. 26, 2008

(65) Prior Publication Data
US 2009/0217324 A1    Aug. 27, 2009

(51) Int. Cl.
| | |
|---|---|
| *H04H 60/45* | (2008.01) |
| *H04H 20/10* | (2008.01) |
| *H04H 60/31* | (2008.01) |
| *H04H 60/46* | (2008.01) |
| *H04N 5/445* | (2011.01) |
| *H04N 7/173* | (2011.01) |
| *H04N 21/258* | (2011.01) |

(Continued)

(52) U.S. Cl.
CPC ............. *H04H 60/45* (2013.01); *G10L 17/00* (2013.01); *H04H 20/106* (2013.01); *H04H 60/31* (2013.01); *H04H 60/46* (2013.01); *H04N 5/44543* (2013.01); *H04N 7/17318* (2013.01); *H04N 21/25891* (2013.01); *H04N 21/42203* (2013.01); *H04N 21/4394* (2013.01); *H04N 21/44222* (2013.01); *H04N 21/4532* (2013.01); *H04N 21/6582* (2013.01); *H04N 21/812* (2013.01)

(58) Field of Classification Search
CPC .. H04H 60/45; H04H 60/46; H04N 21/44218; H04N 21/2668; H04N 21/4223
USPC ..................... 725/9–22, 34, 46, 35
See application file for complete search history.

(56) References Cited

U.S. PATENT DOCUMENTS

| | | | |
|---|---|---|---|
| 5,382,970 | A | 1/1995 | Kiefl |
| 5,457,807 | A | 10/1995 | Weinblatt |

(Continued)

FOREIGN PATENT DOCUMENTS

WO    WO 02104022 A2    12/2002

*Primary Examiner* — Nathan Flynn
*Assistant Examiner* — Alexander Q Huerta
(74) *Attorney, Agent, or Firm* — John R. Pivnichny; Law Office of Jim Boice

(57) ABSTRACT

A method, system and program product for customizing presentation of television content to a specific viewer. The method includes obtaining an Internet Protocol address for a set-top box provided for an interactive television system viewed by a viewer for establishing a physical location of the television system, authenticating, using a voice recognition system installed on the set-top box provided, an identity of the viewer within a viewing area of the interactive television system, recording television viewing habits of the viewer, selecting a customized television content based on the viewer identity authenticated and the viewing habits recorded for the viewer and delivering the customized television content selected to the viewer, based on the viewer's physical location. In an embodiment, the customized television content includes at least one of: television programming, video programming or advertisements, and in an embodiment, the interactive television system is an Internet Protocol based television system.

17 Claims, 5 Drawing Sheets

(51) Int. Cl.
*H04N 21/422* (2011.01)
*H04N 21/439* (2011.01)
*H04N 21/442* (2011.01)
*H04N 21/45* (2011.01)
*H04N 21/658* (2011.01)
*H04N 21/81* (2011.01)
*G10L 17/00* (2013.01)

(56) References Cited

U.S. PATENT DOCUMENTS

| | | |
|---|---|---|
| 5,826,164 A | 10/1998 | Weinblatt |
| 6,112,053 A | 8/2000 | Dunki-Jacobs et al. |
| 6,519,769 B1 | 2/2003 | Hopple et al. |
| 6,611,842 B1 | 8/2003 | Brown |
| 6,654,721 B2 * | 11/2003 | Handelman ............ H04N 7/163 348/E7.061 |
| 7,140,032 B2 * | 11/2006 | Dew et al. ...................... 725/46 |
| 7,260,823 B2 | 8/2007 | Schlack et al. |
| 7,631,325 B2 * | 12/2009 | Rys ................... H04N 21/4532 725/151 |
| 7,873,985 B2 * | 1/2011 | Baum ................. H04L 61/2015 726/2 |
| 2002/0077880 A1 | 6/2002 | Gordon et al. |
| 2002/0194586 A1 * | 12/2002 | Gutta et al. ..................... 725/10 |
| 2003/0005431 A1 * | 1/2003 | Shinohara .............. H04H 60/45 725/12 |
| 2003/0217365 A1 | 11/2003 | Caputo |
| 2004/0078820 A1 * | 4/2004 | Nickum ............ H04N 5/44543 725/58 |
| 2004/0111640 A1 * | 6/2004 | Baum .......................... 713/201 |
| 2005/0172319 A1 * | 8/2005 | Reichardt ............ G11B 27/105 725/52 |
| 2007/0033607 A1 * | 2/2007 | Bryan ..................... 725/10 |
| 2007/0101368 A1 * | 5/2007 | Jacoby et al. ................. 725/45 |
| 2007/0220555 A1 * | 9/2007 | Espelien ........................ 725/46 |
| 2008/0092155 A1 * | 4/2008 | Ferrone ............ H04N 21/25883 725/9 |
| 2009/0133051 A1 * | 5/2009 | Hildreth ............... H04N 5/4403 725/28 |
| 2009/0138805 A1 * | 5/2009 | Hildreth ............ G06K 9/00335 715/745 |
| 2009/0172728 A1 * | 7/2009 | Shkedi et al. ................. 725/34 |

* cited by examiner

SYSTEM, METHOD AND PROGRAM PRODUCT FOR CUSTOMIZING PRESENTATION OF TELEVISION CONTENT TO A SPECIFIC VIEWER AND LOCATION

FIELD OF THE INVENTION

The present invention relates to computer systems and software, and more specifically to an automated technique for customizing presentation of television content, including video content and advertising content, to a specific viewer based on the viewer's physical location.

BACKGROUND OF THE INVENTION

In today's highly competitive market, consumers are overloaded with information, regardless of whether it comes from television advertisements, radio, e-mail spam, cell phones, etc. Further, consumers do not have an easy way to identify and subscribe to available services and often do not have the ability to choose what information to receive and what information not to receive. In order for a service provider to compete successfully in this highly competitive market, a service provider not only needs to deliver the services, but also needs to provide services that are personalized to the consumer and more effective for the advertiser. As such, there is a need for innovative ways to provide services to consumers in a manner that is cost effective.

SUMMARY OF THE INVENTION

In a first aspect, the invention provides a method for automatically customizing presentation of television content to a specific viewer, based on their physical location. The method comprises authenticating an identity of a specific viewer within a viewing area of an interactive television system, recording television viewing habits of the viewer of the interactive television system, selecting a customized television content based on the identity authenticated of the viewer, the known television viewing habits recorded for the viewer, the known physical location of the viewer and the television viewing habits recorded for the viewer and delivering the customized television content selected to the viewer. In an embodiment, the customized television content comprises at least one of: television programming, video programming and advertisement programming, and wherein the interactive television system comprises an IP (Internet Protocol) based television system. In an embodiment, the authenticating step includes obtaining an IP (Internet Protocol) address of the set-top box provided for the IP (Internet Protocol) based television system viewed by the viewer for establishing a physical location of the IP (Internet Protocol) based television system and authenticating, using a voice recognition system, the identity of the specific viewer within the viewing area of the IP (Internet Protocol) based television system. In an embodiment, the recording step includes recording, using the voice recognition system, the television viewing habits of the specific viewer of the IP (Internet Protocol) based television system. The method further includes establishing presence of one or more additional viewers within the viewing area of the interactive television system, attempting authentication of the one or more additional viewers and switching from delivering the customized television content to delivering a different customized television content to the IP (Internet Protocol) television system upon successful authentication of the one or more additional viewers in the viewing area. Further, if authentication of an additional viewer of the one or more additional viewers is unsuccessful, the method includes switching from delivering the customized television content to delivering a general television content to the IP (Internet Protocol) based television system upon failing to authenticate the additional viewer of the one or more additional viewers in the viewing area. The method further includes updating the television viewing habits of the viewer and any of the one or more additional viewers authenticated for the IP (Internet Protocol) based television system.

In another aspect the invention provides a system for delivering customized television content to a specific viewer based, on their physical location. The system comprises an IP (Internet Protocol) based television system located in a physical location, the IP (Internet Protocol) based television system comprises a media gateway having a fixed IP (Internet Protocol) address, and a content customization tool deployed on the media gateway of the IP (Internet Protocol) based television system. In an embodiment, the content customization tool further comprises a voice recognition module for recognizing a respective voice belonging to a respective user of one or more users of the IP (Internet Protocol) based television system, an authentication module for authenticating the respective voice of the respective user of the one or more users of the IP (Internet Protocol) based television system, a recordation module for recording television viewing habits of the respective user of the one or more users of the IP (Internet Protocol) based television system and a delivery module for delivering customized television content based on the respective voice of the respective user of the one or more users authenticated and based on the television viewing habits recorded for the respective user of the one or more users, wherein the customized television content delivered at a given point-in-time is based on authentication of the one or more users present at the physical location at the given point-in-time. In an embodiment, the content customization tool further comprises a location module for assigning a physical location to an IP (Internet Protocol) address for the IP (Internet Protocol) based television system. In an embodiment, the content customization tool further comprises a viewing profile module for maintaining a television viewing profile for each user of the one or more users of the IP (Internet Protocol) based television system and an update module for updating the television viewing profile for each user of the one or more users of the IP (Internet Protocol) based television system. In an embodiment, the content customization tool further comprises a request module for requesting the customized television content from a network programming server. In an embodiment, the request module requests delivery of a general television content when the authentication module is unable to authenticate a user of the one or more users of the IP (Internet Protocol) based television system.

In yet another aspect, the invention provides a computer program product stored on a computer readable medium for automatically customizing presentation of television content to a specific viewer of a network system, based on their physical location. The computer program product comprises a computer readable medium, first program instructions to authenticate an identity of at least one specific viewer within a viewing area of an IP (Internet Protocol) based television system, second program instructions to record television viewing habits of the at least one specific viewer of the IP (Internet Protocol) based television system, third program instructions to deliver to the at least one specific viewer select customized television content based on authentication of the identity and the television viewing habits recorded for the at least one specific viewer. The computer program product further comprises fourth program instructions to present advertisement programming tailored to the at least one specific viewer based on the identity of the at least one specific viewer authenticated and the television viewing habits recorded for the at least one specific viewer. Preferably, each of the first, second, third and fourth program instructions are recorded on the computer readable medium for execution by a central processing unit of the network system for presenting customized television content, including advertising content to the at least one specific viewer. In an embodiment, the first program instructions include instructions to obtain an IP (Internet Protocol) address of the IP (Internet Protocol) based television system viewed by the at least one specific viewer for establishing a physical location of the IP (Internet Protocol) based television system and instructions to authenticate, using a voice recognition system, the identity of the at least one specific viewer within the viewing area of the IP (Internet Protocol) based television system. In an embodiment, the first program instructions include instructions to establish presence of the at least one specific viewer, the at least one specific viewer including any additional viewers within the viewing area of the IP (Internet Protocol) based television system, the first program instructions including instructions to switch delivery from the select customized television content to delivery of a different customized television content to the IP (Internet Protocol) based television system upon authentication of the any additional viewers within the viewing area and wherein the first program instructions include instructions to switch delivery from the select customized television content to delivery of a general customized television content to the IP (Internet Protocol) based television system upon being unable to authenticate an additional viewer of the any additional viewers within the viewing area. In an embodiment, the second program instructions include instructions to record, using the voice recognition system, the television viewing habits of the at least one viewer, including the any additional viewers of the IP (Internet Protocol) based television system. In an embodiment, the third program instructions include instructions to update the television viewing habits of the at least one viewer, including the any additional viewers of the IP (Internet Protocol) based television system.

Further, in yet another aspect, the invention provides a process for deploying computing infrastructure comprises integrating computer-readable code into a computing system, wherein the code in combination with the computing system is capable of performing a process of automatically customizing presentation of television content to a specific viewer, based on their physical location. The process comprises obtaining an IP (Internet Protocol) address of the IP (Internet Protocol) based television system viewed by at least one specific viewer for establishing a physical location of the IP (Internet Protocol) based television system, authenticating, using a voice recognition system, an identity of the at least one specific viewer within a viewing area of the IP (Internet Protocol) based television system, recording, using the voice recognition system, television viewing habits of the at least one specific viewer of the IP (Internet Protocol) based television system, selecting customized television content based on the identity authenticated and the television viewing habits recorded for the at least one specific viewer present at the physical location and delivering the customized television content selected to the at least one specific viewer of the IP (Internet Protocol) based television system. In an embodiment, the customized television content delivered comprises at least one of: television programming, video programming and advertisement programming and wherein the at least one specific viewer comprises additional viewers within the viewing area. The process further comprises establishing presence of one or more additional viewers within the viewing area of the interactive television system, attempting authentication of the one or more additional viewers and switching from delivering the customized television content to delivering a different customized television content to the IP (Internet Protocol) television system upon successful authentication of the one or more additional viewers in the viewing area and based on respective television viewing habits recorded for the one or more additional viewers authenticated. If authentication of an additional viewer of the one or more additional viewers is unsuccessful, the process comprises switching from delivering the customized television content to delivering a general television content to the IP (Internet Protocol) based television system upon failed authentication of the additional viewer of the one or more additional viewers in the viewing area. In an embodiment, the process further comprises updating the television viewing habits of the at least one viewer and the one or more additional viewers of the IP (Internet Protocol) based television system.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Figure 1:
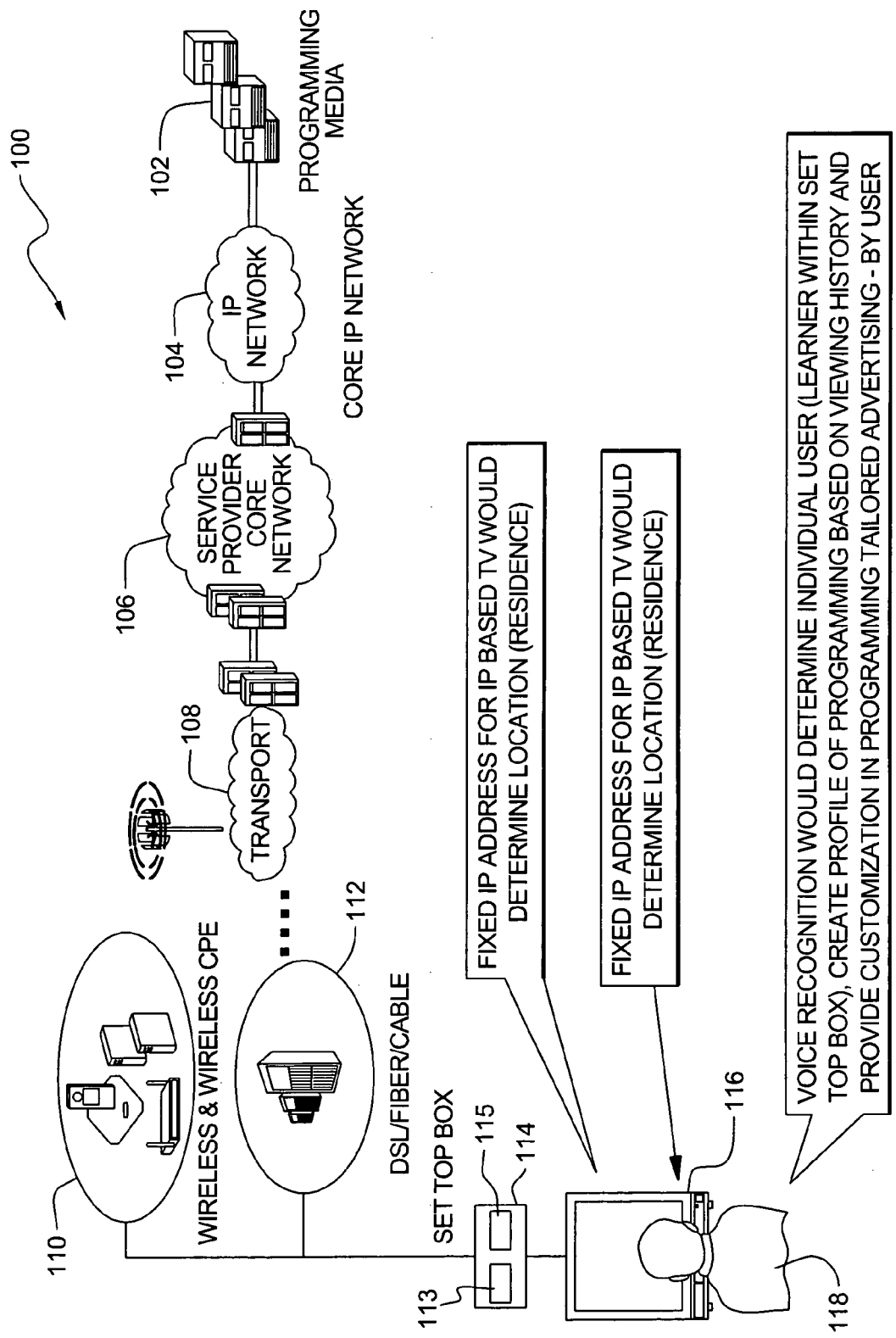
FIG. 1 is a schematic block system diagram illustrating an embodiment of a programming media content system including a set-top box having deployed thereon a content customization tool for automatically customizing presentation of television content, including video content and advertising content to a specific viewer, based on their physical location, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the invention provides a system for automatically customizing presentation of television content, including video content and advertising content to a specific viewer, based on the specific viewer's physical location, in accordance with an embodiment of the present invention. Reference is now made to FIG. 1, reference numeral 100, which illustrates an embodiment of a programming content system that includes a set-top box 114 having deployed thereon a content customization tool 115 for presenting customized IP (Internet Protocol) based programming content, including customized advertising data or content, that is delivered to a rendering device for viewing by a specific subscriber 118, in accordance with an embodiment of the present invention. The IP based programming (often referred to herein as Internet Protocol Television or IPTV) allows end users to receive television content, including video content and advertising content broadcasts over the Internet, via a computer or a television or a modified traditional set. IPTV (Internet Protocol Television) is a system where a digital television service is delivered by using Internet Protocol over a network infrastructure, which may include delivery by a broadband connection. Internet protocol television, or IPTV, uses a two-way digital broadcast signal that is sent through a switched telephone or cable network by way of a high speed internet (broadband) connection, to a CPE (Customer Premise Equipment), such as, a media gateway or set-top box 114. A media gateway is any device, such as a circuit switch, IP gateway, or channel bank that converts data from the format required for one type of network to the format required for another type of network. The media gateway or set-top box 114 is programmed with software that can handle a specific viewer's requests to access programming media content or sources from the service provider. Typically, a television or a rendering device 116 is connected to the media gateway or set-top box 114, which decodes IP formatted signals and converts them into standard television signals. The programming content is delivered to a rendering device, such as, a television or a monitor, for viewing by a specific customer, based on recognition of that specific customer, as explained further herein below. Although, at times herein the Internet Protocol Television invention is described in terms of an image being rendered on a television, it is understood that instead of a television, any other rendering device, such as, a computer monitor, may be used to render the image. Turning to FIG. 1, a service provider, such as, an IPTV service provider, stores programming media or content, such as, IP television programming content, in one or more storage systems 102. Typically, the service provider has subscriptions to one or more content providers, who provide content that is used to populate the programming media or content stored in system 102 by the service provider. In an embodiment, the service provider maintains its own service provider core network 106, which is typically configured in a multilinked topology that provides any-to-any connections among devices on the network. Further, the service provider core network 106 works in conjunction with the IP network (Internet Protocol network) 104 for accessing programming media stored in storage 102 and for providing subscribed customers with customized programming content selected from the programming media stored in storage 102. The IP (Internet Protocol) network 104, is a network in which transmission of information or data is carried out using the TCP/IP protocol (Transmission Control Protocol/Internet Protocol) and, as such, an IP connection allows connection to the Internet or any other network that is IP based. The programming media or content stored in storage system 102 is delivered or transmitted by the service provider to one or more subscribed customers 118 over the IP network 104, using the service provider's core network 106. As shown in FIG. 1, the programming media or content is transported via a transport mechanism or system 108 either wirelessly (as shown by reference numeral 110) or via wired lines (as shown by reference numeral 112). For instance, the programming media may be transported wirelessly to a CPE (Customer Premise Equipment) device, such as, a set-top box or unit 114 that is provided by the service provider and is physically located at a specific subscriber's location or residence. A set-top box or set-top unit is a device that connects to a television and an external source of signal, turning the signal into content which is then displayed on the television screen or a rendering device. Alternatively, the programming media may be transported via wires (such as, DSL (Digital Subscriber Line), optical fiber, twisted-pair copper wire cable, coaxial cable) to CPE devices, such as, DSL (Digital Subscriber Line) modems and/or cable modems. For instance, in a wireless scenario, a television signal is transmitted to some sort of a beaconing device, such as, a wireless tower used in a given location and the signal is transmitted to a CPE (Customer Premise Equipment) device, such as, the media gateway or set-top box 114, located at a specific subscriber or specific user's residence or physical location. Similarly, in a wired scenario, a television signal is transmitted via the wired lines to the media gateway or set-top box 114. In either case, the signal from the beaconing device or the DSL or optical fiber or cable line is transmitted to the set-top box 114. Typically, a service provider provides a subscribed customer 118 with a media gateway or set-top box or unit 114. The set-top box or unit 114 has a fixed IP (Internet Protocol) address that is assigned specifically to the customer and their known physical location for communicating with other devices or computer systems, such as, the service provider core network 106 that provides IP based television service. Further, in an embodiment, the set-top box 114 has installed thereon a content customization tool or software 115 (discussed further herein below with respect to FIGS. 3 and 4) for automatically customizing presentation of television content, including video content and advertising content to a specific viewer. The content customization tool 115 installed on the set-top box 114 uses the fixed IP address for the IP based television for establishing physical location or residence of the specific subscriber or specific user or specific customer 118. Further, in an embodiment, the content customization tool 115 installed on the set-top box 114 utilizes voice recognition technology (reference numeral 113) installed on the set-top box to authenticate an identity of an individual or specific subscriber or user or customer 118, which is learned by the set-top box 114, as described further herein below with respect to FIG. 2. The content customization tool 115 installed on the set-top box 114 is used to create a profile of programming based on a viewing history recorded for a specific subscriber or specific user 118 and automatically provides the specific subscriber 118 with customized programming content and tailored advertising based on the profile for the specific user or specific subscriber 118, without the specific viewer's input and based on the user's location. Alternatively, the service provider records viewing data based on the set-top box 114 IP address as to what that specific subscriber 118 is watching and automatically provides the specific subscriber with customized programming content.

Figure 2:
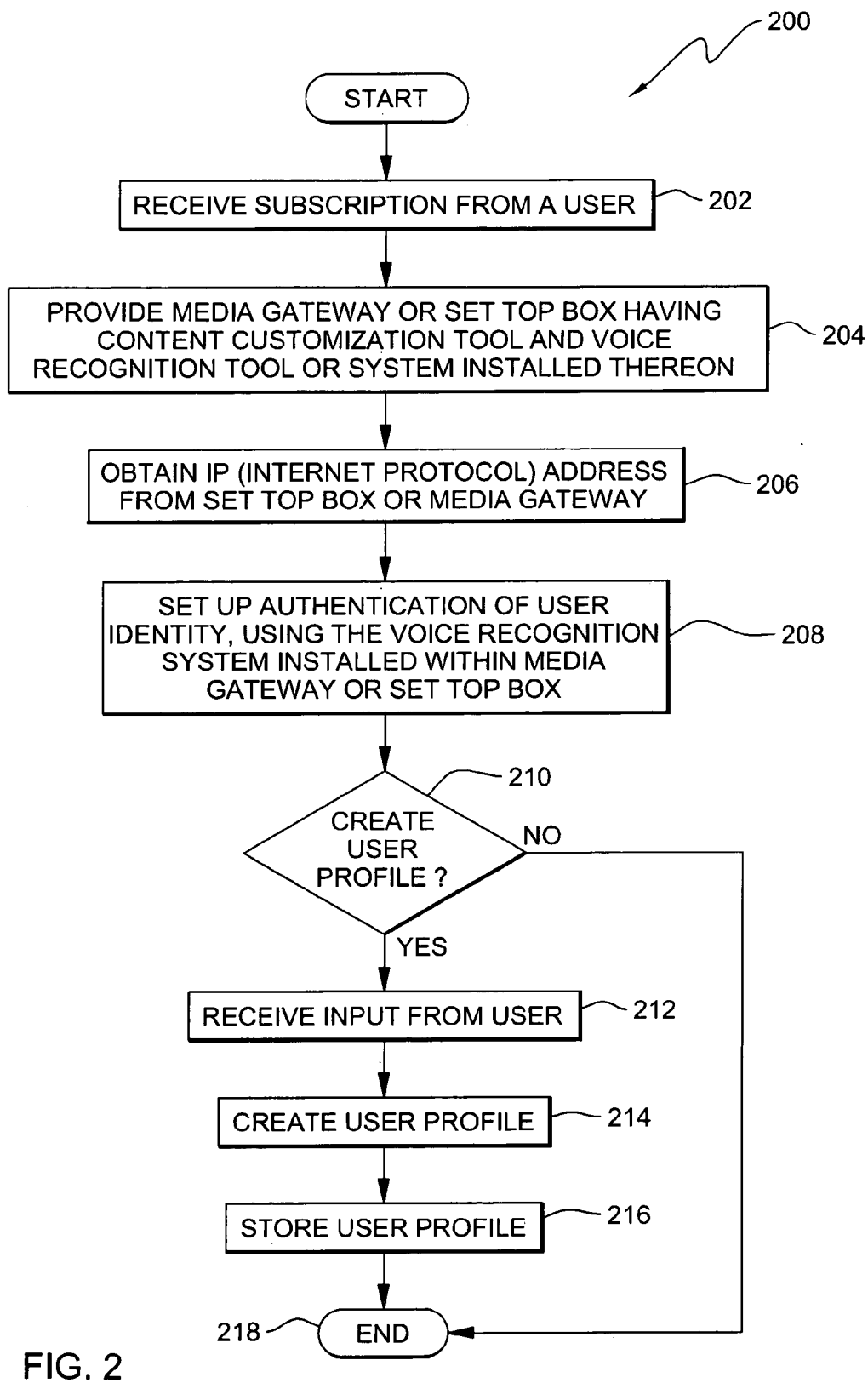
FIG. 2 depicts a flowchart outlining the initial steps performed by the content customization tool deployed on a set-top box or unit for providing customized or tailored presentation of television content, including video content and advertising content to a specific viewer, based on their physical location, in accordance with an embodiment of the present invention.

Turning to FIG. 2, reference numeral 200 depicts a flowchart outlining the steps for setting up a profile and/or preferences on a media gateway or set-top box or unit (reference numeral 114 shown in FIG. 1) having a content customization tool (reference numeral 115 shown in FIG. 1) deployed thereon for automatically customizing presentation of television content, including video content and advertising content, sent to a specific viewer, in accordance with an embodiment of the present invention. The method starts in step 202 with a service provider receiving a subscription from a specific user for subscribing to IP based programming service or IPTV service. The service provider provides in step 204 a media gateway or set-top box or unit that has installed thereon a content customization tool and a voice recognition tool or system for authenticating a voice of a specific subscriber or specific user. Further, the media gateway or set-top box or unit has a fixed IP address (Internet Protocol address). The service provider obtains, in step 206, via its network server the IP address of the media gateway or set-top box for establishing residence of the specific subscriber. Further, in an embodiment, the content customization tool installed on the set-top box prompts the specific subscriber or specific user in step 208 to set up authentication of the specific user's or specific subscriber's identity, which utilizes the voice recognition system installed on the media gateway or set-top box to learn the voice of the specific subscriber or specific user for identification purposes. In step 210, the content customization tool established whether or not the specific subscriber wants to create a profile. If the specific user does not wish to create a user profile in step 210, the process ends at step 218. However, if the content customization tool establishes that the subscriber wants to create a user profile, then in step 212, the content customization tool receives input from the specific user as to likes and/or dislikes pertaining to programming content and tracks the user's viewing habits to further define the programming content that is suitable for future programming and advertising requests. In step 214, the content customization tool creates a user profile based on the input received and stores, in step 216, the user profile in either a local memory or storage within the set-top box or in an external memory or storage associated with the network server, ending the process at step 218. The steps described in FIG. 2 are carried out by the content customization tool only when a subscriber initially subscribes to the customized television content service and a subset of these steps are repeated at a later point-in-time, only if the user wishes to change data that was inputted into the content customization tool.

Figure 3:
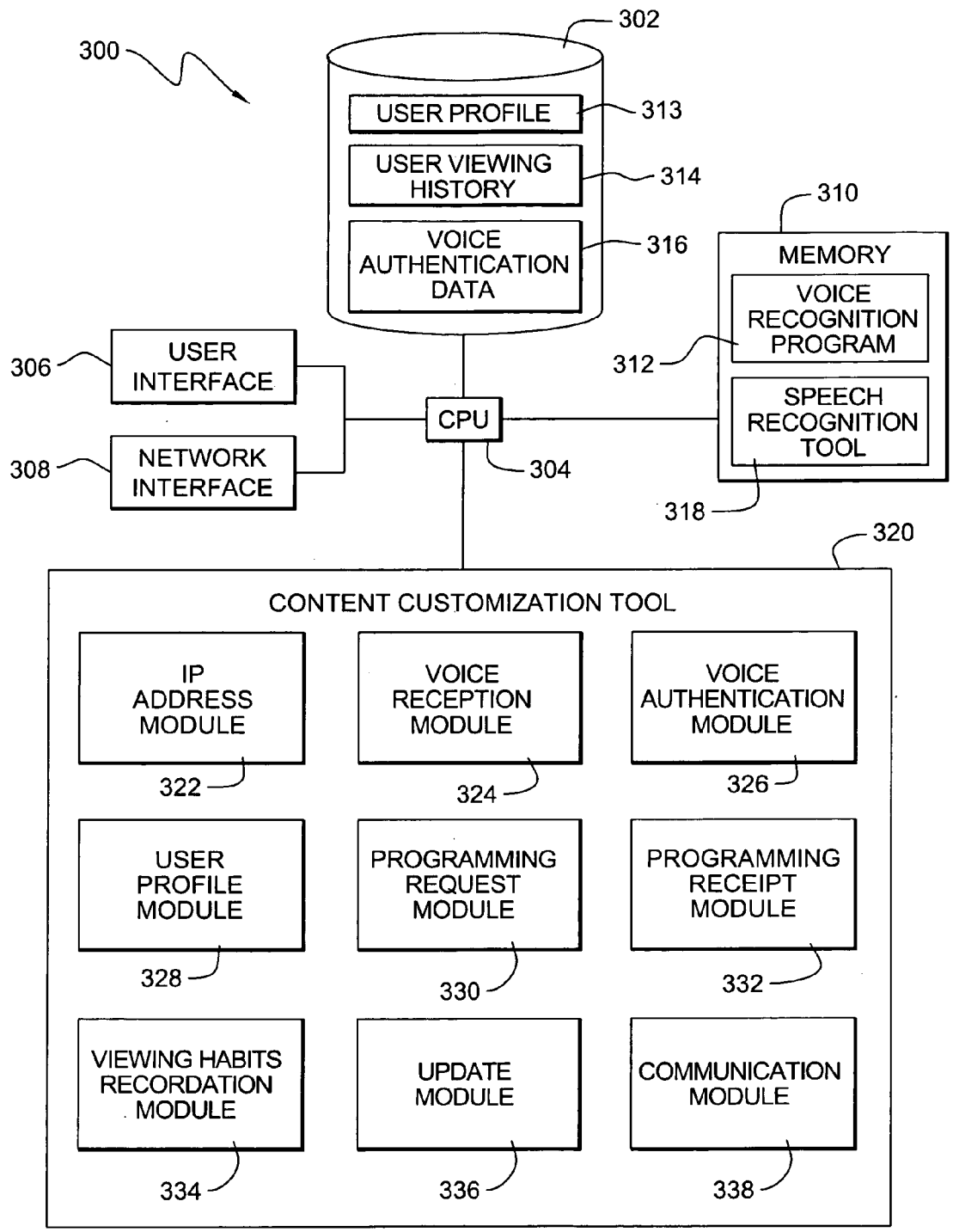
FIG. 3 depicts an embodiment of a set-top box or unit having deployed thereon a content customization tool for automatically customizing presentation of television content, including video content and advertising content to a specific viewer, based on their physical location, in accordance with an embodiment of the present invention.

Turning to FIG. 3, reference numeral 300 depicts a schematic block system diagram illustrating one embodiment of a media gateway or set-top box or unit 300 that connects to a television and an external source of signal for turning the signal into content, which is displayed or rendered on a television screen. In an embodiment, the set-top box 300 has deployed or installed thereon a content customization tool or program 320 for automatically customizing presentation of television content, including video content and advertising content to a specific viewer. In an embodiment, the set-top box 300 has deployed within an internal memory 310, a voice recognition program 312 that is configured to recognize or authenticate a voice of a specific user or specific viewer. In an embodiment, the voice recognition program 312 installed on the set-top box 300 may further comprise a speech recognition tool 318 that is configured to convert spoken words to machine-readable input, for instance, converting the spoken words "TV on" to binary code representing the string of characters. As shown in FIG. 3, in an embodiment, the set-top box or unit 300 includes a central processing unit (CPU) 304, a local storage device 302, a user interface 306, a network interface 308, and a memory 310. The CPU 304 is configured generally to execute operations within the set-top box or unit 300, such as, the voice recognition program 312 and/or the speech recognition tool 318. The user interface 306, in one embodiment, is configured to allow a specific user or specific viewer to interact with the set-top box 300, including allowing input of data and commands from a specific user or specific viewer and communicating output data to the specific user or specific viewer. The network interface 308 is configured, in one embodiment, to facilitate network communications between the set-top box or unit 300 and a communications channel of a service provider network, as discussed herein above with respect to FIG. 1. In an embodiment, the local memory 310 is configured to store one or more applications or programs, such as, a voice recognition program 312 for recognizing who is speaking and/or a speech recognition tool 318 for recognizing what is being said. Further, in an embodiment, user or viewer profiles 313 created, user viewing habits or history 314 recorded and voice authentication data 316 for specific users are stored by the content customization tool 320 within local storage system 302. Alternatively, the user or viewer profiles 313 created, user viewing habits or history 314 recorded and voice authentication data 316 for specific users may be stored in memory 310 or in a separate or external storage, such as, in a storage associated with a network server of a service provider.

In an embodiment, as shown in FIG. 3, the content customization tool or tool 320 which runs on the set-top box or unit 300 comprises a logic unit that contains a plurality of modules configured to functionally execute the necessary steps of automatically customizing presentation of television content, including video content and advertising content to a specific viewer. In particular, the content customization tool or tool 320 includes an IP (Internet Protocol) address or location module 322, a voice reception module 324, a voice authentication module 326, a user profile module 328, a programming request module 330, a programming receipt module 332, a viewing habits recordation module 334, an update module 336 and a communication module 338. In an embodiment, the IP address or location module 322 is configured to provide the IP address of the set-top box 300 to the network server of the service provider for establishing a physical location or residence of the specific viewer or specific user or specific subscriber. The voice reception module 324 is configured to listen and receive a voice or sound produced by a specific viewer. In an embodiment, the voice reception module 324 forwards speech data associated with the sound received from the specific user to the speech recognition tool 318 (in local memory 310) for performing speech recognition, that is, determining what the specific user is saying, for instance, "television on". In an embodiment, the voice authentication module 326 is configured to forward the voice or sound produced and received from a specific viewer or specific user to the voice recognition program 312 for authenticating the identity of the specific user or specific viewer, based on the specific user's voice. Further, the voice authentication module 326 is configured to receive voice authentication information from the voice recognition program 312 that verifies identification of the specific user or specific viewer speaking. In an embodiment, the voice authentication data 316 is stored in storage 302. The user profile module 328 is configured to create one or more user profiles 313 (shown as being stored in storage 302) based on a specific viewer or specific user's likes and dislikes of television programming content, including advertising content or commercials, as discussed herein above with respect to FIG. 2. The programming request module 330 is configured to send a request to the network server requesting programming data based on whether or not the identity of the specific viewer is authenticated by the voice recognition program 312. For instance, if the identity of the specific viewer is authenticated, then the content customization tool 320 automatically requests customized programming data for the specific viewer or specific user. However, if the identity of the specific viewer is not authenticated, then the content customization tool 320 automatically requests general programming data for the specific viewer or specific user, as discussed further herein below with respect to FIG. 5. Further, the programming receipt module 332 is configured to receive the appropriate programming data, whether general or customized programming data for the viewer or user. The viewing habits recordation module 334 is configured to record viewing habits of the specific viewer or specific user in order to create a user viewing history 314 for the specific viewer or specific user, which is shown as being stored in storage 302. The update module 336 is configured to update user profiles or user viewing history based on actions performed by the specific user. Further, the communication module 338 is configured to permit communication between the various modules of the content customization tool or tool 320 and other components, such as, the voice recognition program 312, the speech recognition tool 318 and/or storage 302, which stores the user profiles 313, user viewing history or logs 314 and voice authentication data 316. As mentioned herein above, the content customization tool 320 automatically customizes presentation of television content, including video content and advertising content to a specific viewer based on identifying a specific viewer, using the voice recognition program 312, and utilizing data pertaining to a specific viewer's viewing history 314 and utilizing specific user or specific viewer profiles 313 that are created, without receiving any requests or direct input from the specific user for specific programming.

Figure 4:
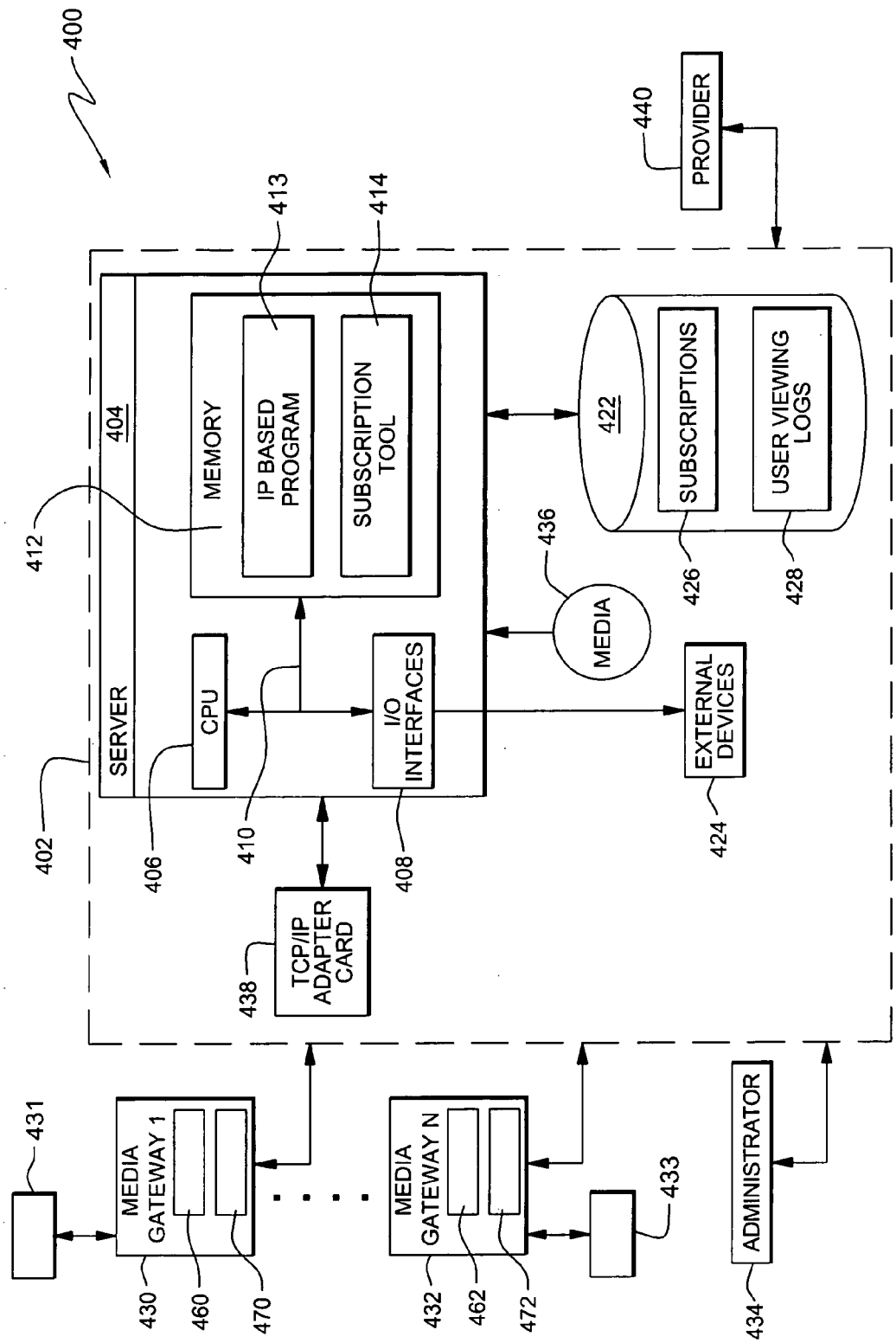
FIG. 4 is a schematic block system diagram illustrating an embodiment of a programming media network infrastructure that includes one or more set-top boxes or units, each having deployed thereon a content customization tool for automatically customizing presentation of television content, including video content and advertising content to specific viewers, based on their respective physical locations, in accordance with an embodiment of the present invention.

Referring now to FIG. 4, there is illustrated a computer system 400 that includes a computer infrastructure 402 that includes a network server 404 that is networked to multiple media gateways 1 through N, reference numerals 430 through 432. In an embodiment, the media gateways, 430 through 432, comprise of set-top boxes or units 430 through 432, having installed thereon a content customization tool 460 through 462, respectively, as described herein above with respect to FIG. 3. The media gateways or set-top boxes 430 through 432 within computer infrastructure 402 include a computer program product (the content customization tool or code) for automatically customizing presentation of television content, including video content and advertising content to a specific viewer, in accordance with an embodiment of the present invention. Further, the media gateways or set-top boxes 430 through 432 within computer infrastructure 402 include respective voice recognition systems 470 through 472 configured to authenticate respective voices of respective users, which are used by the content customization tool installed on the respective media gateways or set-top box boxes 430 through 432. The computer program product comprises a computer readable or computer-usable medium, which provides program code, such as, the content customization tool, as described herein above with respect to FIG. 3. The data or viewing history logs recorded by the content customization tool (460 through 462) installed on the media gateways (reference numeral 430 through 432) can be loaded into network server 404 from a computer readable media 436, such as, a magnetic tape or disk, optical media, DVD, memory stick, semiconductor memory, etc. or downloaded from the Internet via a TCP/IP adapter card 438. As depicted in FIG. 4, system 400 includes a computer infrastructure 402, which is intended to represent any type of computer architecture that is maintained in a secure environment (i.e., for which access control is enforced). As shown, infrastructure 402 includes a network server 404 that typically represents an application server or system 404 or the like that includes an IP (Internet Protocol) based program 413 for providing IP based programming to specific viewers of an IP based device, such as, a television. The network server 404 further includes a subscription tool 414 configured to manage viewer subscriptions 426 (stored in storage 422) for IP (Internet Protocol) based programming. It should be understood, however, that although not shown, other hardware and software components (e.g., additional computer systems, routers, firewalls, etc.) could be included in infrastructure 402.

In general, a media gateway 1 (reference numeral 430) through media gateway N (reference numeral 432) may access the network server 404, which has deployed thereon the IP based program 413 and the subscription tool 414, which implements the invention. In an embodiment, the content customization tool or tool (460 through 462) installed on a respective media gateway (1 through N, reference numerals 430 through 432) is called or invoked by the IP based program 413 running on the network server 404 to provide customized presentation of television content, including video content and advertising content to a respective television screen or monitor (reference numeral 450 through 452) for viewing by a respective viewer.

As shown in FIG. 4, the network server 404 (which has implemented thereon the IP based program 413 and the subscription tool 414) is shown to include subscriptions 426 and user viewing logs 428, stored by the network server in a storage 422. In particular, a specific user utilizing a media gateway (reference numeral 430 through 432) gains access to the IP based programming offered by network server 404 over a network via interfaces (e.g., web browsers) loaded on a media gateway 1 through N. In an embodiment, the network can be any type of network such as the Internet, a local area network (LAN), a wide area network (WAN), a virtual private network (VPN), etc. In any event, communication with infrastructure 402 could occur via a direct hardwired connection (e.g., serial port), or via an addressable connection that may utilize any combination of wired line and/or wireless transmission methods. Moreover, conventional network connectivity, such as Token Ring, Ethernet, Wi-Fi (Wired Fidelity) or other conventional communications standards could be used. Still yet, connectivity could be provided by conventional TCP/IP sockets-based protocol. In this instance, the parties could utilize an Internet service provider to establish connectivity to infrastructure 402. It should be understood that under the present invention, infrastructure 402 could be owned and/or operated by a party such as a virtual provider 440, or by an independent entity. Regardless, use of infrastructure 402 and the teachings described herein could be offered to the parties on a subscription or fee-basis. In either scenario, an administrator 434 could support and configure infrastructure 402, for instance, upgrading the IP based program 413 or the content customization tool (reference numerals 460 through 462) deployed on each of the media gateways 1 through N, respectively.

The network server 404 is shown to include a CPU (hereinafter "processing unit 406"), a memory 412, a bus 410, and input/output (I/O) interfaces 408. Further, the network server 404 is shown in communication with external I/O devices/resources 424 and storage system 422. In general, processing unit 406 executes computer program code, such as the IP based program 413 and the subscription tool 414. While executing computer program code, the processing unit 406 can read and/or write data to/from memory 412, storage system 422, and/or I/O interfaces 408. For instance, in one embodiment, the IP based program 413 stores user viewing logs 428 in storage 422. Alternatively, the data stored in storage 422 may be stored in a separate storage within the system 404. Bus 410 provides a communication link between each of the components in computer system 400, such that information can be communicated within the infrastructure 402. External devices 424 can comprise any devices (e.g., keyboard, pointing device, display, etc.) that enable a user to interact with computer system 400 and/or any devices (e.g., network card, modem, etc.) that enable server 404 to communicate with one or more other computing devices.

Computer infrastructure 402 is only illustrative of various types of computer infrastructures for implementing the invention. For example, in an embodiment shown, computer infrastructure 402 comprises two or more computing devices (e.g., a server cluster) that communicate over a network to perform the various process steps of the invention. Moreover, computer system 400 is only representative of various possible computer systems that can include numerous combinations of hardware. To this extent, in other embodiments, computer system 400 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 406 may comprise a single processing unit, or be distributed across one or more processing units in one or more locations, e.g., on a client and server. Similarly, memory 412 and/or storage system 442 can comprise any combination of various types of data storage and/or transmission media that reside at one or more physical locations. Further, I/O interfaces 408 can comprise any system for exchanging information with one or more external devices 424. Still further, it is understood that one or more additional components (e.g., system software, math co-processing unit, etc.) not shown in FIG. 4 can be included in computer system 400. However, if computer system 400 comprises a handheld device or the like, it is understood that one or more external devices 424 (e.g., a display) and/or storage system(s) 442 could be contained within network server 404, and not externally as shown. Storage system 442 can be any type of system (e.g., a database) capable of providing storage for information under the present invention, such as, the files to be preprocessed by the IP based program 413. To this extent, storage system 442 could include one or more storage devices, such as a magnetic disk drive or an optical disk drive. In another embodiment, storage system 442 includes data distributed across, for example, a local area network (LAN), wide area network (WAN) or a storage area network (SAN) (not shown). Although not shown, additional components, such as cache memory, communication systems, system software, etc., may be incorporated into computer system 400.

Figure 5:
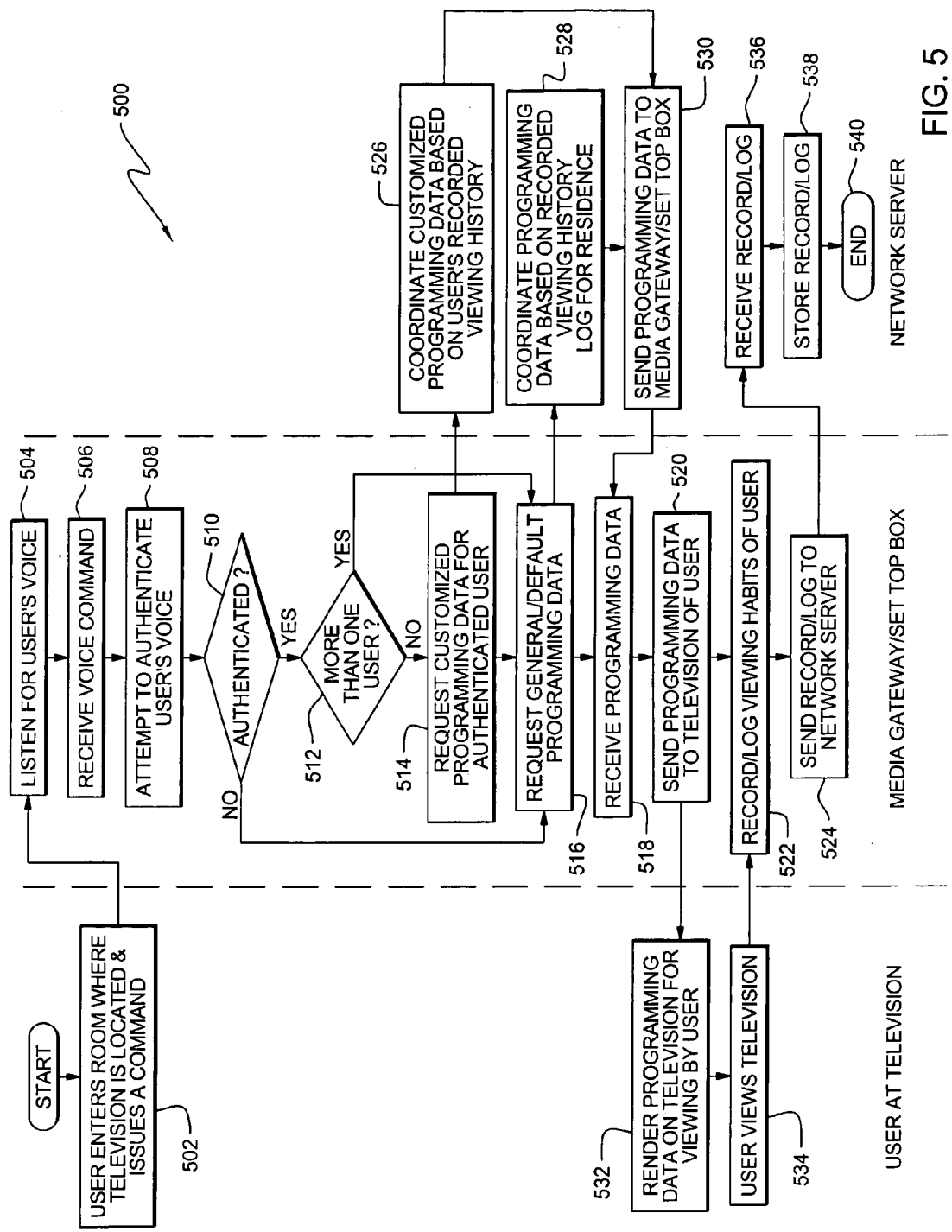
FIG. 5 is a flowchart outlining the steps performed by a content customization tool installed on a set-top box or unit and a network server for automatically customizing presentation of television content, including video content and advertising content to a specific viewer, based on their physical location, in accordance with an embodiment of the present invention.

In another embodiment, as shown in FIG. 5, the invention provides a method 500 for automatically customizing presentation of television content, including video content and advertising content to a specific viewer. Turning to FIG. 5, reference numeral 500 outlines the steps carried out by a content customization tool or program (discussed herein above) installed on a media gateway or set-top box for automatically customizing presentation of television content, including video content and advertising content to a specific viewer. The method begins with a specific user entering (step 502) a room where the IP based television or monitor is located and with the specific user issuing a voice command, such as, "TV on". The content customization tool installed on the media gateway or set-top box listens (in step 504) for the specific user's voice. The content customization tool receives the voice command in step 506 and attempts to authenticate the specific user's voice in step 508. In an embodiment, the content customization tool sends the voice data to the voice recognition program for authenticating the specific user's voice. In step 510, the content customization tool determines whether or not the specific user has been authenticated. If the specific user has been authenticated, the content customization tool further determines in step 512 whether or not there are more than one users whose voice has been analyzed by the voice recognition program. If the content customization tool determines that there is only one user in step 512, then the content customization tool sends a request in step 516 to the network server requesting customized programming data for the authenticated user in step 514. The network server receives the request and coordinates in step 526 customized programming data based on the specific user's recorded viewing history. However, if in step 512, the content customization tool determines that more than one voice was detected, then the content customization tool sends a request to the network server requesting general or default programming data for the multiple users. The network server receives the request and coordinates in step 528 programming data based on the recorded viewing history log for the residence or physical location of the specific viewers. The network server sends in step 530 either the customized programming data or the general programming data coordinated in steps 526 and 528, respectively, to the media gateway or set-top box. The media gateway or set-top box receives the appropriate programming data in step 518 and sends in step 520 the appropriate programming data to the IP based television or computer monitor of the specific viewer(s) or specific user(s). The appropriate programming data is received and rendered on the IP based television or computer monitor of the specific user(s) for viewing by the specific user(s) in step 532 and the specific user views the television programming data on the IP based television or computer monitor in step 534. Further, the content customization tool on the media gateway or set-top box records or logs the viewing habits of the specific user(s) in step 522 and sends the record or log of the viewing habits of the specific user(s) to the network server in step 524. The network server receives the record or log from the media gateway or set-top box in step 536 and the network server stores the record or log of the viewing habits in a storage in step 538, ending the method in step 540.

Accordingly, the invention provides the ability to automatically send customized programming and advertising based on the physical location (provided by the IP address assigned to the set-top box) of a household by tracking the viewing habits of the specific users within a household, but further provides the ability to track the viewing habits of each specific user in the household, based on their physical location and by using voice recognition technology to automatically send customized programming and customized advertising based on which specific user happens to be watching television. As such, a customized programming content can be created for and presented to a first user in a household based on the first user's viewing history and a different customized programming content can be created for and presented to a second user in the household. For example, when a user A enters a room, the user A uses his or her voice to turn the television on, given that the set-top box has already been set up to authenticate user A based on user A's physical location, as dictated by the IP address of the set-top box. Further, the set-top box records what user A watches on the television and based on user A's viewing habits, the set-top box automatically determines what kind of programming content, including what kinds of advertising should be presented to user A based on the user profile created and/or the viewing habits recorded for user A, without receiving requests or input for specific programming from user A. For example, if user A likes to watch sports, then the content customization tool within the set-top box may present advertising pertaining to local sports teams and/or sports shops located in the local vicinity of user A. Further, if someone else, for instance, user B, enters the room, the set-top box would recognize that another user is present, given that the set-top box is configured to listen for voices. As such, if user B is someone within the household, that is, someone whose identity can be authenticated using their voice, the set-top box may present customized programming content that is suitable for both user A and user B, using the profiles and/or viewing habits recorded for users A and B. However, if user B is someone that the set-top box cannot authenticate, then the set-top box switches to general programming that is based on a viewing history recorded for the household.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for customizing presentation of television programming content to a viewer, said method comprising:
   a processor authenticating an identity of a viewer within a viewing area of an interactive television system, wherein said interactive television system comprises an Internet Protocol based television system;
   the processor recording television viewing habits of said viewer of said interactive television system;
   the processor selecting a customized television programming content based on said identity being authenticated and said television viewing habits recorded for said viewer;
   the processor automatically tailoring and delivering said customized television programming content selected to said viewer without said viewer's input;
   the processor obtaining an Internet Protocol address of said set-top box provided for said Internet Protocol based television system viewed by said viewer;
   the processor establishing a physical location of said Internet Protocol based television system based on said Internet Protocol address of said set-top box;

the processor automatically tailoring and delivering said customized television programming content to said viewer based on the physical location of said Internet Protocol based television system;

the processor establishing a presence of one or more additional viewers within said viewing area of said interactive television system;

the processor attempting authentication of an identity of said one or more additional viewers;

in response to an authentication of the identity of an additional viewer from said one or more additional viewers being unsuccessful, the processor switching from delivering said customized television programming content to delivering a general television content to said Internet Protocol based television system;

the processor detecting multiple voices at the physical location of said Internet Protocol based television system; and in response to detecting multiple voices at the physical location of said Internet Protocol based television s stem the processor switching from delivering said customized television programming content to delivering the general television content to said Internet Protocol based television system.

2. The method according to claim 1, wherein said Internet Protocol address is assigned to a known physical location of said Internet Protocol based television system.

3. The method according to claim 1, wherein said recording television viewing habits further comprises:

recording, using said voice recognition system, said television viewing habits of said viewer of said Internet Protocol based television system.

4. The method according to claim 1, further comprising:

establishing the presence of said one or more additional viewers within said viewing area of said interactive television system;

attempting authentication of identities of said one or more additional viewers; and switching from delivering said customized television programming content to delivering a different customized television content to said Internet Protocol based television system upon successful authentication of identities of said one or more additional viewers in said viewing area.

5. The method according to claim 1, further comprising:

providing the customized television programming content to the viewer via a subscription for content provided from multiple content providers.

6. A system for delivering customized television content to a viewer, comprising:

an Internet Protocol based television system located in a physical location, said Internet Protocol based television system comprising a media gateway having a fixed Internet Protocol address; and a content customization tool deployed on said media gateway of said Internet Protocol based television system, said content customization tool comprising:

a voice recognition module for recognizing a respective voice belonging to a respective user of one or more users of said Internet Protocol based television system;

an authentication module for authenticating said respective voice of said respective user of said one or more users of said Internet Protocol based television system;

a recordation module for recording television viewing habits of said respective user of said one or more users of said Internet Protocol based television system;

a location module for assigning said physical location to an Internet Protocol address for said Internet Protocol based television system; and a delivery module for automatically delivering customized television content based on said respective voice of said respective user of said one or more users being authenticated, said television viewing habits recorded for said respective user of said one or more users, and said physical location of the Internet Protocol address for said Internet Protocol based television system, wherein said customized television content delivered at a given point-in-time is based on authentication of said one or more users present at said physical location at said given point-in-time, wherein said customized television content is automatically tailored and delivered to a viewer without input from said viewer, and wherein said request module requests delivery of a general television content in response to said authentication module being unable to authenticate a user of said one or more users of said Internet Protocol based television system.

7. The system according to claim 6, further comprising:

a viewing profile module for maintaining a television viewing profile for each user of said one or more users of said Internet Protocol based television system.

8. The system according to claim 7, further comprising:

an update module for updating said television viewing profile for said each user of said one or more users of said Internet Protocol based television system.

9. The system according to claim 8, further comprising:

a request module for requesting said customized television content from a network programming server, wherein the network programming server delivers content from multiple content providers to said one or more users via a subscription agreement.

10. A computer program product for customizing presentation of television content to a viewer of a network system, said computer program product comprising:

a non-transitory computer readable storage medium;

first program instructions to authenticate an identity of at least one viewer within a viewing area of an Internet Protocol based television system;

second program instructions to record television viewing habits of said at least one viewer of said Internet Protocol based television system;

third program instructions to tailor and deliver, to said at least one viewer, customized television content based on authentication of said identity and said television viewing habits recorded for said at least one viewer;

fourth program instructions to obtain an Internet Protocol address of said set-top box provided for said Internet Protocol based television system viewed by said viewer;

fifth program instructions to establish a physical location of said Internet Protocol based television system;

sixth program instructions to automatically tailor and deliver said customized television programming content to said at least one viewer based on the physical location of said Internet Protocol based television system;

seventh program instructions to record said television viewing habits of said at least one viewer of said Internet Protocol based television system;

eighth program instructions to establish a presence of one or more additional viewers within said viewing area of said interactive television system;

ninth program instructions to attempt authentication of said one or more additional viewers; and tenth program instructions to, in response to an authentication of an additional viewer of said one or more additional viewers being unsuccessful, switch from delivering said customized television programming content to delivering a general television content to said Internet Protocol based television system; and wherein said first, second, third, fourth, fifth, sixth, seventh, eighth, ninth, and tenth program instructions are recorded on said non-transitory computer readable storage medium for execution by a central processing unit of said network system for presenting customized television content to said at least one viewer.

11. The computer program product according to claim 10, further comprising:

eleventh program instructions to present advertisement programming tailored to said at least one viewer based on said identity of said at least one viewer authenticated and said television viewing habits recorded for said at least one viewer, and wherein said twelfth program instructions are recorded on said non-transitory computer readable storage medium for execution by said central processing unit of said network system for presenting advertising programming tailored to said at least one viewer.

12. The computer program product according to claim 11, wherein said first program instructions include instructions to obtain an Internet Protocol address of said Internet Protocol based television system viewed by said at least one viewer in order to establish a physical location of said Internet Protocol based television system and instructions to authenticate, using a voice recognition system, said identity of said at least one viewer within said viewing area of said Internet Protocol based television system.

13. The computer program product according to claim 12, wherein said first program instructions include instructions to establish a presence of said at least one viewer, said at least one viewer including any additional viewers within said viewing area of said Internet Protocol based television system, said first program instructions including instructions to switch delivery from said select customized television content to delivery of a different customized television content to said Internet Protocol based television system upon authentication of said any additional viewers within said viewing area, and wherein said first program instructions include instructions to switch delivery from said select customized television content to delivery of a general customized television content to said Internet Protocol based television system upon being unable to authenticate an additional viewer of said any additional viewers within said viewing area.

14. The computer program product according to claim 13, wherein said second program instructions include instructions to record, using said voice recognition system, said television viewing habits of said at least one viewer and, said any additional viewers of said Internet Protocol based television system.

15. The computer program product according to claim 14, wherein said third program instructions include instructions to update said television viewing habits of said at least one viewer and said any additional viewers of said Internet Protocol based television system.

16. A process for deploying computing infrastructure comprising integrating computer-readable code into a computing system, wherein said code in combination with said computing system is capable of performing a process of customizing presentation of television programming content to a viewer, said process comprising:

obtaining an Internet Protocol address of said Internet Protocol based television system viewed by at least one viewer for establishing a physical location of said Internet Protocol based television system;

authenticating, using a voice recognition system, an identity of said at least one viewer within a viewing area of said Internet Protocol based television system;

recording, using said voice recognition system, television viewing habits of said at least one viewer of said Internet Protocol based television system;

selecting a customized television programming content based on said identity being authenticated and said television viewing habits recorded for said at least one viewer present at said physical location;

delivering said customized television programming content selected to said at least one viewer of said Internet Protocol based television system;

obtaining an Internet Protocol address of said set-top box provided for said Internet Protocol based television system viewed by said at least one viewer;

establishing a physical location of said Internet Protocol based television system;

automatically tailoring and delivering said customized television programming content to said at least one viewer based on the physical location of said Internet Protocol based television system;

recording said television viewing habits of said at least one viewer of said Internet Protocol based television system;

establishing a presence of one or more additional viewers within said viewing area of said interactive television system;

attempting authentication of said one or more additional viewers; and in response to an authentication of an additional viewer of said one or more additional viewers being unsuccessful, switching from delivering said customized television programming content to delivering a general television content to said Internet Protocol based television system.

17. The process according to claim 16, wherein said customized television programming content comprises television programming, video programming and advertisement programming, and wherein said interactive television system comprises an Internet Protocol based television system, and wherein said at least one viewer comprises additional viewers within said viewing area.

* * * * *